(12) United States Patent
Reymann et al.

(10) Patent No.: US 10,489,973 B2
(45) Date of Patent: Nov. 26, 2019

(54) 3D FACE RECONSTRUCTION FROM GATE CAMERA

(71) Applicant: Cubic Corporation, San Diego, CA (US)

(72) Inventors: Steffen Reymann, Reigate (GB); Jon Packham, Ashford (GB)

(73) Assignee: Cubic Corporation, San Diego, CA (US)

( * ) Notice: Subject to any disclaimer, the term of this patent is extended or adjusted under 35 U.S.C. 154(b) by 448 days.

(21) Appl. No.: 15/228,227

(22) Filed: Aug. 4, 2016

(65) Prior Publication Data

US 2017/0053435 A1    Feb. 23, 2017

Related U.S. Application Data

(60) Provisional application No. 62/206,107, filed on Aug. 17, 2015.

(51) Int. Cl.
| | |
|---|---|
| *G06T 17/10* | (2006.01) |
| *G06T 7/55* | (2017.01) |
| *G06K 9/00* | (2006.01) |
| *H04N 7/18* | (2006.01) |
| *G07C 9/00* | (2006.01) |
| *G07C 9/02* | (2006.01) |
| *G06T 19/20* | (2011.01) |

(52) U.S. Cl.
CPC .......... *G06T 17/10* (2013.01); *G06K 9/00228* (2013.01); *G06K 9/00288* (2013.01);
(Continued)

(58) Field of Classification Search
CPC .......... G06T 17/10; G06T 2207/30201; H04N 7/183; G06K 9/00228; G06K 9/00288; G06K 9/00771
(Continued)

(56) References Cited

U.S. PATENT DOCUMENTS

| | | | |
|---|---|---|---|
| 2003/0142853 A1 | 7/2003 | Waehner et al. | |
| 2004/0262383 A1* | 12/2004 | Zielinski | G07C 9/00126 235/382 |

(Continued)

OTHER PUBLICATIONS

International Search Report and Written Opinion dated Nov. 18, 2016 for International Patent Application No. PCT/US2016/046038, filed Aug. 8, 2016; all pages.

(Continued)

*Primary Examiner* — On S Mung
(74) *Attorney, Agent, or Firm* — Kilpatrick Townsend & Stockton LLP (57) ABSTRACT

A method of creating a 3-dimensional facial reconstruction of a user of a transit system includes detecting a user within a range of an image capture device positioned at a transit access point. A plurality of images of a first portion of the user's face are captured using the image capture device while the user passes through the range of the image capture device. A plurality of positions of the user may be detected as the user passes through the range of the image capture device. The plurality of images are combined with the plurality of positions and a relative angle and position of the user's face are calculated based on the combination of the plurality of images and the plurality of positions. A 3-dimensional model of the first portion of the user's face is generated based on the calculated relative angle and position and the 3-dimensional model is stored.

18 Claims, 7 Drawing Sheets

(52) U.S. Cl.
CPC ............ *G06K 9/00771* (2013.01); *G06T 7/55* (2017.01); *G06T 19/20* (2013.01); *G07C 9/00563* (2013.01); *G07C 9/00571* (2013.01); *G07C 9/02* (2013.01); *H04N 7/183* (2013.01); *G06T 2207/30201* (2013.01); *G06T 2219/2004* (2013.01)

(58) Field of Classification Search
USPC .......................................................... 348/77
See application file for complete search history.

(56) References Cited

U.S. PATENT DOCUMENTS

| 2005/0205668 | A1 | 9/2005 | Sogo | |
|---|---|---|---|---|
| 2010/0207624 | A1* | 8/2010 | Lionheart | G01N 27/72 324/258 |

OTHER PUBLICATIONS

Steffens, et al.; "PersonSpotter—Fast and Robust System for Human Detection, Tracking and Recognition"; Automatic Face and Gesture Recognition, 1998; Proceedings; Third IEEE International Conference on Nara, Japan; Apr. 14-16, 1998, Los Alamitos, CA; *IEEE Comput. Soc, US*; Apr. 14, 1998; DOI: 10.1109/AFGR.1998,671000; ISBN: 978-0-8186-8344-2; pp. 516-521.

Von Duhn, et al.; "Three-View Surveillance Video Based Face Modeling for Recogniton"; Biometrics Symposium, 2007; *IEEE*: Sep. 2007; pp. 1-6.

Krüger, et al.; "Estimation of Face Position and Pose with Labeled Graphs"; *Proceedings of the British Machine Vision Conference 1996*; Sep. 9, 1996; Edinburgh, UK; pp. 1-9.

\* cited by examiner

3D FACE RECONSTRUCTION FROM GATE CAMERA

CROSS-REFERENCES TO RELATED APPLICATIONS

This application claims priority to U.S. Provisional Patent Application No. 62/206,107 filed Aug. 17, 2015, entitled "3D FACE RECONSTRUCTION FROM GATE CAMERA," the entire disclosure of which is hereby incorporated by reference, for all purposes, as if fully set forth herein.

BACKGROUND OF THE INVENTION

In conventional systems, the use of facial representation and recognition of a human's face is limited to traditional two-dimensional (2D) facial recognition of only a front of a user's face. Traditional 2D facial recognition can be unreliable, and may require a passenger to be facing a particular direction for a positive identification to be made. As such, there are many difficulties in using facial recognition to positively identify users of transit and/or other transportation systems.

BRIEF SUMMARY OF THE INVENTION

The current invention relates generally to creating a three-dimensional (3D) representation of a human's face at a fare gate. Embodiments of the present invention use cameras situated in a fare gate to construct a 3D representation of a passenger's face as they pass through the fare gate. A camera installed in the middle of the gate walkway may be triggered by a ticket validation event. The camera may record a number of frames of the passenger's face as they move through the walkway. A position of the user may be monitored during the capturing of the frames. The positional information may be combined with the camera frames taken and a relative angle and position of the face at each position may be calculated. A 3D model of at least the half of the face that is facing the camera may be generated based on the relative angle and position of the face. With the use of 3D facial models the passenger's face may be used as a biometric travel token.

In one aspect, a method of creating a 3-dimensional facial reconstruction of a user of a transit system is provided. The method may include detecting a user within a range of an image capture device positioned at a transit access point. The method may also include capturing a plurality of images of a first portion of the user's face using the image capture device while the user passes through the range of the image capture device. A plurality of positions of the user may be detected as the user passes through the range of the image capture device. The method may also include combining the plurality of images with the plurality of positions and calculating a relative angle and position of the user's face based on the combination of the plurality of images and the plurality of positions. The method may further include generating a 3-dimensional model of the first portion of the user's face based on the calculated relative angle and position and storing the 3-dimensional model.

In another aspect, a non-transitory computer-readable medium having instructions embedded thereon for creating a 3-dimensional facial reconstruction of a user of a transit system is provided. The instructions may include computer code for causing the computing device to detect a user within a range of an image capture device positioned at a transit access point. The instructions may also include computer code for causing the computing device to capture a plurality of images of a first portion of the user's face using the image capture device while the user passes through the range of the image capture device. The instructions may further include computer code for causing the computing device to detect a plurality of positions of the user as the user passes through the range of the image capture device and to combine the plurality of images with the plurality of positions. The instructions may include computer code for causing the computing device to calculate a relative angle and position of the user's face based on the combination of the plurality of images and the plurality of positions. The instructions may also include computer code for causing the computing device to generate a 3-dimensional model of the first portion of the user's face based on the calculated relative angle and position and to store the 3-dimensional model.

In another aspect, a system for creating a 3-dimensional facial reconstruction of a user of a transit system is provided. The system may include an image capture device positioned to capture an image of a user's face as the user passes through an access control point. The system may also include a user detection module configured to determine when a user is within a range of the image capture device and a position module configured to determine a position of the user as the user passes through the access control point. The system may include a facial model generation module configured to generate a 3-dimensional model using images from the image capture device. The system may further include a communications module, a memory, and a processor. The processor may be configured to detect, using the detection module, the user within a range of the image capture device positioned at a transit access point. The processor may also be configured to capture a plurality of images of a first portion of the user's face using the image capture device while the user passes through the range of the image capture device. The processor may be further configured to detect, using the user detection module, a plurality of positions of the user as the user passes through the range of the image capture device. The processor may be configured to combine the plurality of images with the plurality of positions and to calculate a relative angle and position of the user's face based on the combination of the plurality of images and the plurality of positions. The processor may also be configured to generate, using the facial model generation module, a 3-dimensional model of the first portion of the user's face based on the calculated relative angle and position and to store the 3-dimensional model.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The current invention relates generally to creating a 3D representation of a human's face at a fare gate or other restricted walkway, although embodiments may extend to other applications that utilize facial recognition techniques. Embodiments, allow for a 3D face capture using only a single camera. 3D facial recognition provides greater identification accuracy compared to frontal face imaging only, and allows the system to derive additional user identification characteristics (e.g. gender, age, etc.). While discussed largely with respect to single camera transit system applications, it will be appreciated that some systems may utilize two or more cameras to generate 3D facial models. For example, a camera may be positioned on either side of a gate walkway. Other applications may include applications in which transit vending machines (TVMs) are equipped with cameras, e.g., using multiple cameras from TVMs that are placed in a row to capture passenger picture from multiple angles.

Embodiments of the present invention use cameras situated at a fare gate (in a transit and/or other transportation system) to construct a three-dimensional (3D) representation of a passenger's face as the passenger passes through the fare gate. This can then be used for more accurate facial recognition application, such as use of a passenger's face as a biometric travel token and/or matching against a set of known faces (e.g. a police search list). The invention is based on the idea that the gate walkway restrict passenger movement in a predictable and measurable way. A camera installed in the middle of the gate walkway (for instance in the display pod), can be triggered by a ticket validation event and record a number of frames of the passenger's face as they move through the walkway. The frames may depict various angles of a person's face acquired with different passenger movement directions relative to the camera. Typically, the passenger will break a number of beams as they pass through the fare gate, allowing the system to calculate a position of the passenger at any time during the passage. The invention combines the positional information of the passenger with the camera frames taken, calculates the relative angle and position of the passenger's face in these frames, and combines this into a 3D model of at least the half of the passenger's face. The full 3D model of the face can be completed if the same procedure is used as the passenger passes through a gate with the camera positioned on an opposite side of the passenger's, such as when the user passes through the same gate in an opposite direction (e.g., entry vs. exit direction). Frontal face recognition or identification via ticket (e.g., smartcard) can be used to combine the face data from different gates. Additionally, a continuous refinement of the 3D model is possible as passengers passes through multiple gates as new models are generated for each passage that may be combined with stored 3D models.

Embodiments of the invention enable the detection of transit fare misuse when an attempt to match 3D face data to a previously stored 3D model fails. Misuse may be detected by matching a transit media identifier, facial data, and/or previous transit system records associated with a particular user. The combination of the 3D models with ticket data allows for a build-up of an accurate passenger profile, as a user identify, an image of the user, and/or a transit account or fare identifier linked to a particular user may be known and associated with one another. The 3D models may allow for an accurate matching against list of known faces possible (e.g. blacklist or whitelist) and allows the use of facial images and models as biometric travel tokens. For example, a user may pass through a fare gate and, upon recognition, have a transit account debited based on the passage.

Figure 1:
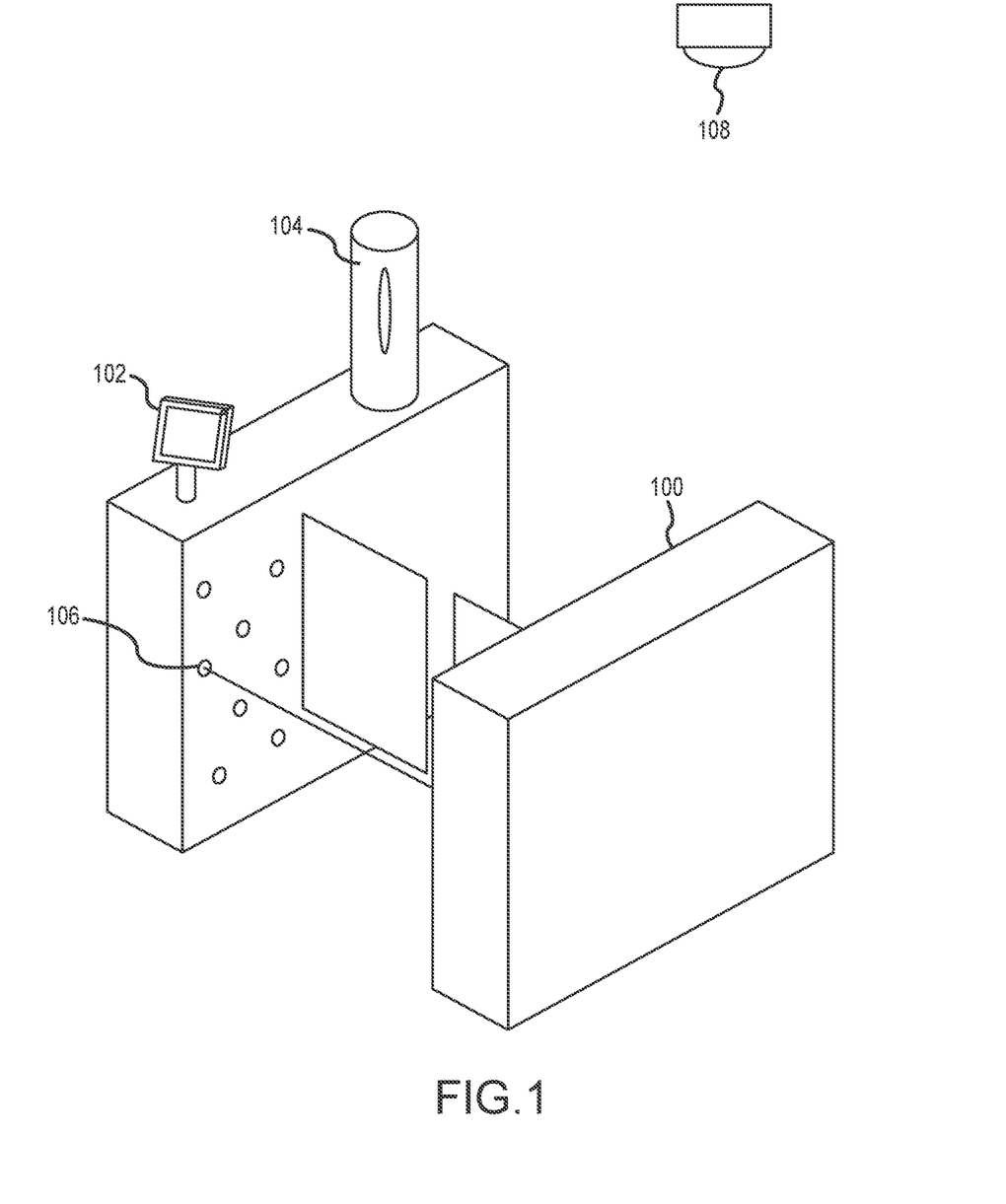
FIG. 1 depicts a system for generating a 3D facial model of users of a transit system according to embodiments.

Turning now to FIG. 1, a system for generating a 3D facial model of users of a transit system is shown. The system may include a fare access gate 100, although it will be appreciated that other access points may be used. Fare access gate 100 may be configured such that only a single user and/or single line of users may pass through fare access gate 100 at a time. Fare access gate 100 may include a user detection module, such as a fare validation reader 102 that may help determine when a user is within range of an image capture device 104. Fare validation reader 102 may be used to scan fare media as users enter the fare access gate 100 to access the transit system. Upon receiving a fare input and/or other fare validation event, the fare validation reader 102 may trigger the image capture device 104 and/or a position module. In addition to triggering the image capture device 104, information received using the fare validation reader 102 may be used to store generated 3D models with a transit user account of the imaged user. Additionally, the data received may be used to look up an existing transit user account and to retrieve any stored 3D models with which a new 3D model may be compared.

The image capture device 104 may include one or more still cameras, video cameras, and/or other imaging devices. In some embodiments, the image capture device 104 may be motion activated such that it may serve as its own user detection module. Image capture device 104 may be positioned such that images of faces of people within a specific height range may be captured. In other embodiments, multiple cameras may be positioned at a transit gate 100 such that multiple angles and heights of images may be captured. This allows a greater size range of users and positions of user to be recognized and/or imaged. In some embodiments, the image capture device 104 may be angled such that it is able to capture a typical angle of a passenger's face. For example, image capture device 104 may be angled toward an entry point of the fare access gate 100 and/or may be directed at a position where a passenger's face is expected. As one example, the image capturing device 104 may be directed to capture a user's face as a user looks down to swipe a ticket at the fare validation reader 102. When activated, image capture device 104 may take any number of images of a user's face. Oftentimes dozens of images may be taken as the user passes through the fare access gate 100 and/or the range of the image capture device 102.

The position module may include position beams or sensors 106 and/or additional image capture devices, such as wide angle camera 108. The position module may be used as a detection module to trigger image capture and/or may be used to track a position of a user as the user passes through the fare access gate 100 and/or through a range of the image capture device 104. For example, beams of position sensors 106 may be broken as the users passes by. Based on these breaks, the user's position may be monitored. Position sensors 106 may be light and/or sound-based. For example, infrared (IR) sensors may be used to determine a position of the user. While shown here as being at a level near a lower half of a user's body, it will be appreciated that position sensors 106 may be positioned at any height relative to a user's body. Wide angle camera 108 may be positioned such that it can detect a position of the user relative to the fare access gate 100 and/or image capture device 102. The position of the user may be combined with a corresponding 2D image from the image capture device 102 for use in generating a 3D model of at least a portion of the user's face. The combination of the positions and the images may be done, for example, by matching up timestamps of each image with a corresponding timestamp of the position sensor data. In some embodiments, the position information may be matched with the images by using an estimated, measured, and/or average walking speed of the user to determine a location for each image. The position of the user may be determined, allowing for a more accurate 3D model to be generated.

As one example, the position information may be combine with the images to generate a series of data points or coordinates that may be mapped out on a 3D coordinate system. The position information may be used to help identify facial features from one image to the next such that the data points corresponding to particular facial features may be properly placed on the coordinate system. This produces a mesh that may serve as a facial model for the user. As additional data and models are generated, more data points may be collected, which may be used to fill in gaps in the mesh to create a more complete and accurate model of the user's face.

In some embodiments, a second image capture device may be positioned on an opposite side of the fare access gate 100 such that images of both sides of a user's face may be captured. This allows a 3D model of the entire face of the user to be generated. In some embodiments, rather than having a second image capture device, the fare access gate 100 may be bidirectional, such that when a user exits the transit system, images of an opposite side of the user's face may be captured.

Upon generation of the 3D model, facial recognition may be used as a supplementary or sole means of identification for the transit system. For example, a user may scan a ticket at a fare validation device. As the user's image is captured and a 3D model is generated, the 3D model may be compared against existing models. If a match is found, the user may be granted access to the transit system, such as by an audio, visual, and/or physical indication being triggered. As one example, a passage light may be activated and/or a physical barrier of a fare access gate may be moved. Upon a successful match, the existing 3D model may be updated with the newly generated model data. If the newly generated model does not match an existing model, the user and/or a transit authority may be alerted. This may cause the user to be prompted for an alternate form of identification to ensure that the user does actually own the transit account and/or fare media used to access the gate. In some embodiments, the user may be prevented from accessing the transit system.

Figure 2:
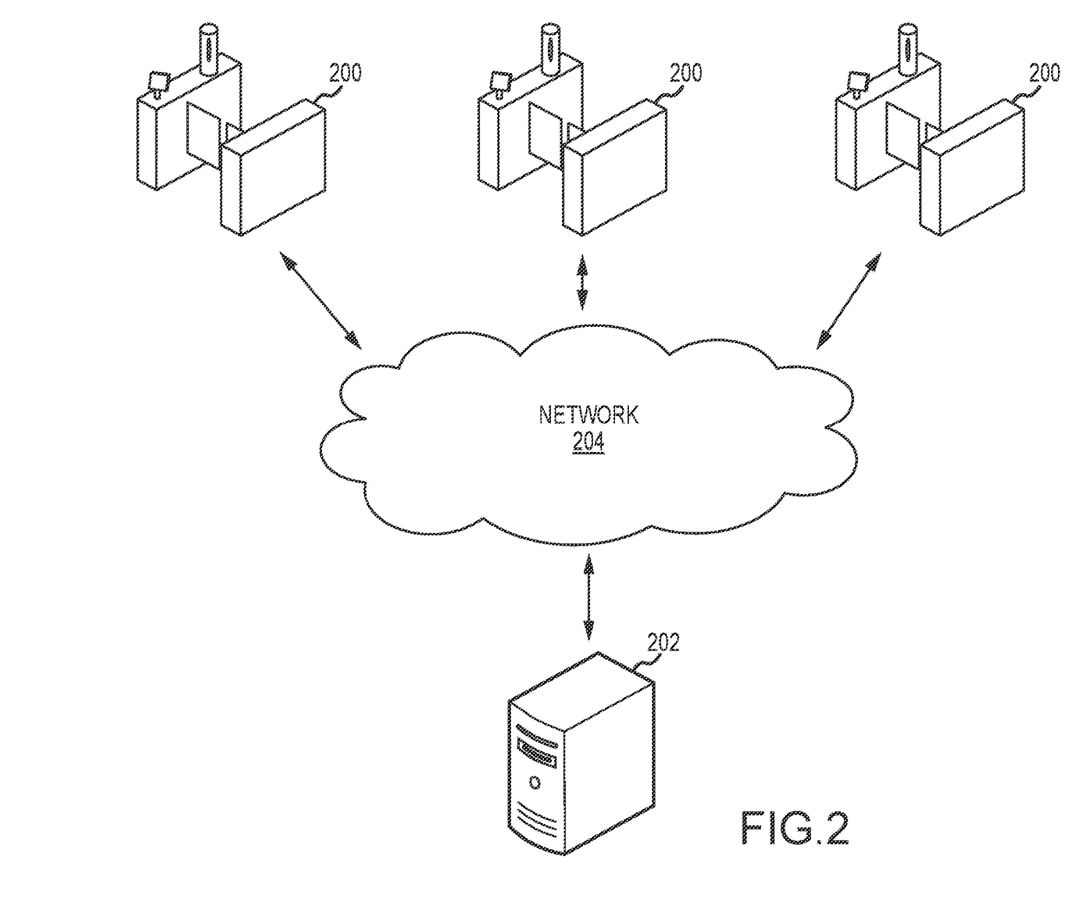
FIG. 2 depicts a transit system having a number of fare access gates according to embodiments.

FIG. 2 shows a transit system having a number of fare access gates 200. Fare access gates 200 may be similar to fare access gate 100 described above, and each may be configured to capture images and positions of users who access the transit system. The images and positions may be used to generate 3D models of at least a portion of each user's face. Each fare access gate 200 may be connected to a central server 202, such as using network 204. Network 204 may be a local area network (LAN) and/or other private or public wired and/or wireless networks. Network 204 may utilize one or more of Wi-Fi, ZigBee, Bluetooth™, Bluetooth™ Low Energy, a cellular communications protocol such as 3G, 4G, or LTE, and/or any other wireless communications protocol. Network 204 may be communicatively coupled with one or more of the components of the system to facilitate communication between the various components. It will be appreciated that one or more different network connections may be used in accordance with the invention, and that the use of a single network 204 to enable communications is merely one example of such configurations. For example, each component may be communicatively coupled with other components using a separate network for one or more of the connections.

Upon creation of the 3D model, each fare access gate 200 may communicate the 3D model to central server 202, which may store the 3D model for use by any of the fare access gates 200. In some embodiments, the 3D model may be generated at the central server 202 and/or using a separate 3D model generation module in communication with the central server 202 and/or the fare access gates 200. In such embodiments, the position data and/or images may be communicated from the fare access gates 200 to the central server 202 and/or the 3D model generation module, which may generate the 3D models based on the received data.

The 3D models may be continuously updated, as users make multiple passes through one or more of the fare access gates 200. For example, each time a user passes through a fare access gate 200, additional images and position information is gathered. This data may be used to further develop an existing 3D model. The additional data points may provide for a more accurate representation of a user's face. Additionally, a 3D model may change and evolve over time based on the new data, which may reflect changes in a user's appearance due to factors such as a change in hair length and/or style, aging, a switch from contacts to glasses, and/or other changes. In some embodiments, upon detecting that a user is wearing an accessory, such as glasses or a hat, it may be determined that the collected model is an outlier that may be discarded such that the existing 3D model is not updated. In other embodiments, a secondary profile may be generated that includes the accessory. This allows the user to have multiple profiles and models such that identification of the user is possible even when the user's appearance varies slightly due to accessories.

The stored 3D models may be used to detect transit fare misuse. For example, the system may attempt to match 3D face data to a previously stored 3D model. When this matching fails, it may be indicative of the face data belonging to a person who is in possession of another user's fare media. The combination of the 3D models with ticket data allows for a build-up of an accurate passenger profile, as both a user and image of the user may be known and associated with one another. The 3D models may allow for an accurate matching against list of known faces possible (e.g. blacklist or whitelist) and allows the use of facial images and models as biometric travel tokens.

Figure 3:
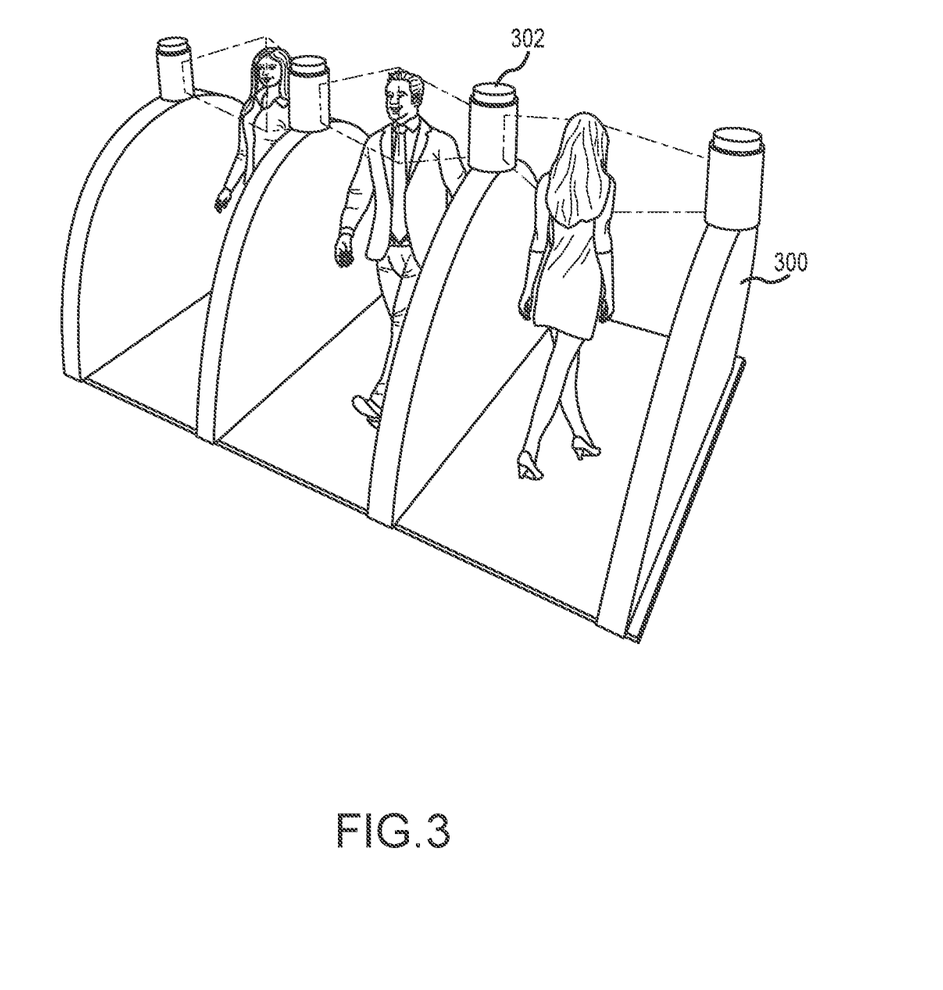
FIG. 3 depicts a series of fare access gates according to embodiments.

FIG. 3 depicts a series of fare access gates 300, each configured to capture images of users' faces for use in 3D model generation. As user's walk through the fare access gates 300, images of their faces may be captured and used to generate 3D models of the users. Fare access gates 300 may each have one or more image capture devices 302. Fare access gates 300 may allow for users to pass through in a single direction or may be configured for bidirectional travel. A single image capture device 302 may be able to capture images of a first side of a user's face in a first direction and of an opposite side of the user's face when the user passes through the fare access gate 300 in a second direction. In other embodiments, an image capture device 302 may be provided on each side of the fare access gate 300 such that both sides of the user's face may be captured upon a single passage through the fare access gate 300.

Figure 4:
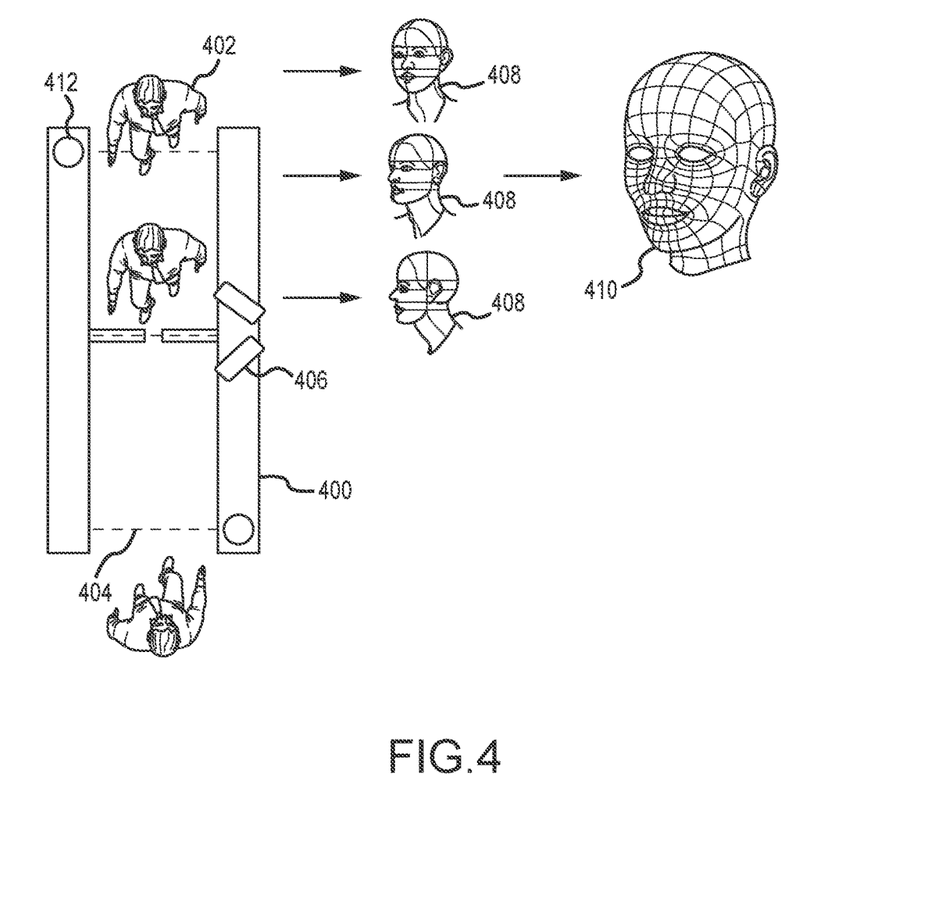
FIG. 4 depicts a fare access gate according to embodiments.

FIG. 4 depicts a fare access gate 400 for capturing images and positional information to generate 3D models of transit system users. As a user 402 passes through fare access gate 400, he may break one or more position beams 404 that collect position information of the user 402. One or more image capture devices 406 are positioned to capture images 408 of the user's face as the user passes through the fare access gate 400. Images 408 may be 2D images of a portion of the user's face. For example, images 408 may be taken of various angles of a single side of the user's face as the user's position changes relative to the image capture device 406. These images 408 are matched up with the position information and used to generate a 3D model 410 of the portion of the user's face captured in the 2D images. As the user passes through the same or different fare access gate 400, additional images may be captured and used to improve or otherwise update the 3D model. In some embodiments, a remaining portion of the user's face may be modeled as images of a second side or other portion of a user's face are captured. Additional sets of images may be matched to the user by face matching the user, such as by comparing the additional images and/or a new 3D model with an earlier match to the image captures, and/or by using a unique identifier associated with the transit fare media.

In some embodiments, to make the 3D model more accurate, one or more external inputs may be utilized. Some or all of the external inputs may utilize device and system present in typical fare access gates. As one example, a fare validation device 412 may receive an input as a user validates a transit fare media prior to passing through the fare access gate 400. Information read from the transit fare media can uniquely identify the user and also trigger the facial image capture process. Additionally, as the image capture devices are often positioned at a fixed height on the fare access gate 400, additional parameters, such as the height of the user, may be captured and stored with the facial data.

Figure 5:
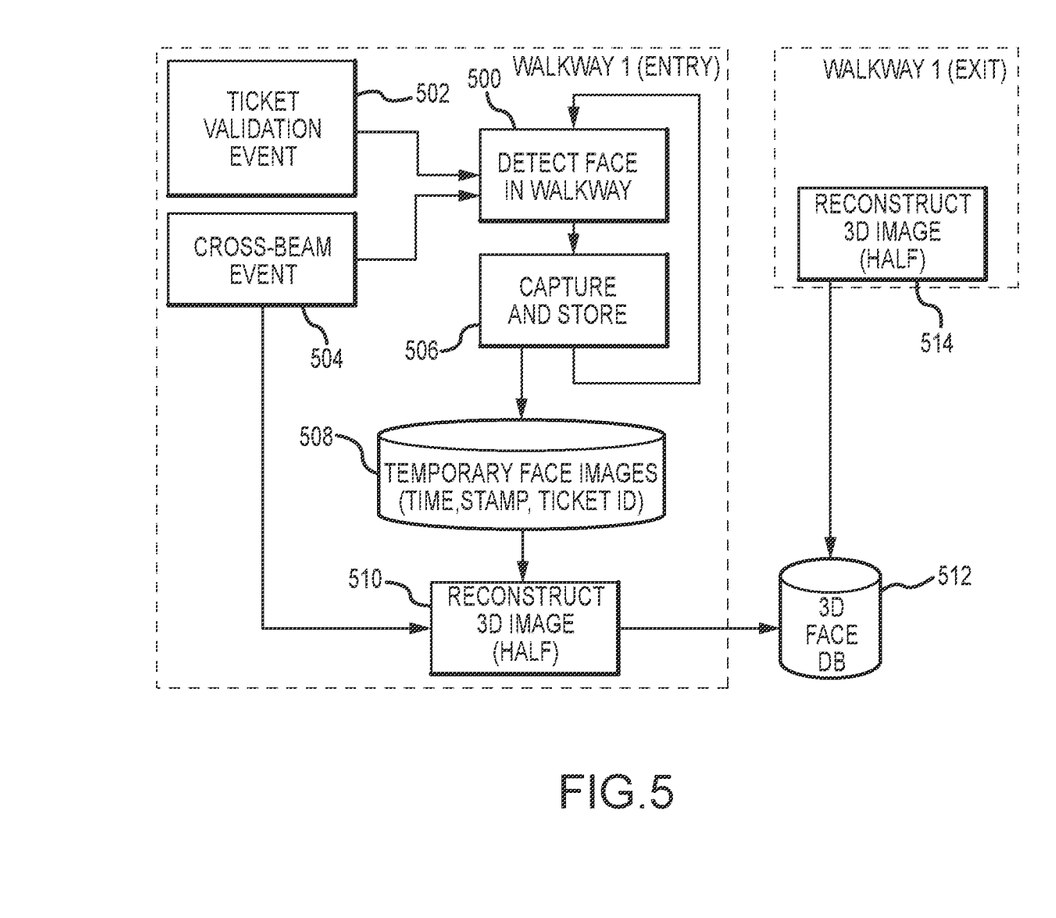
FIG. 5 depicts a process flow for generating 3D facial models according to embodiments.

FIG. 5 depicts a process flow for generating 3D facial models according to one embodiment of the invention. The process flow may be performed using a fare access gate, a central server, and/or other computing, position-sensing, and/or imaging devices. At block 500, a person's face may be detected in the fare access gate as the person passes through in an entry direction. This may be done in many ways, including detecting a ticket validation event at block 502 and/or detecting a cross-beam event at block 504. A ticket validation event may include detecting when a user presents a ticket or other fare media to a fare media reader positioned on or near a fare access gate. This may alert a 3D modeling system that a user is present near the image capture device and may trigger the image capture to begin capturing images of a user. A cross-beam event may include the user passing through and breaking one or more position-sensing beams, such as IR or other light beams and/or sound waves. This may indicate that the user is passing through the fare access gate and/or is in range of the image capture device such that the image capture device is triggered. Additionally, the breaking of the beams may detect a position of the user and/or the user's face as the user passes through the fare access gate. In some embodiments, the image capture device(s) may be recording at all times. In such embodiments, upon detecting a user, images of the user's face may be stored. In some embodiments, this may include adding a number of frames from the image capture device(s) that occur immediately prior to the detection of the user/validation event to those frames captured after the detection, thus, providing even more images of the user's face.

At block 506, one or more images of a user's face may be captured and stored, such as on a temporary face image database 508. The temporary face image database 508 may be part of the fare access gate and/or a central server. The images may include various angles of a side of the user's face as the user passes through the fare access gate. Along with the images, a timestamp of each image and/or position and/or a ticket identifier or other fare media identifier captured during the ticket validation event may be stored on the database 508. The images and position information may be matched and used to reconstruct a 3D model of the side of the user's face at block 510. This 3D model may be stored in a 3D face database 512. In some embodiments, a 3D image of the other side of the user's face may be similarly generated at block 514 as the person passes through the fare access gate in an exit direction. This 3D model may matched with the first 3D model and stored in 3D face database 512.

Upon generating and storing the 3D model, the 3D model may be matched against a set of known faces, such as for whitelisting and/or blacklisting users of the transit system. In addition, using a unique ticket identifier and/or face matching, the system may continuously improve the 3D model of the user's face. In instances where a model does not match a previously stored 3D model, such as when one or more parameters of the 3D model are too different than previously stored models, the system may provide an alert that a possible fraud has occurred. For example, the user may be using a personalized fare media that does not belong to them as it has been previously used by a different person.

Figure 6:
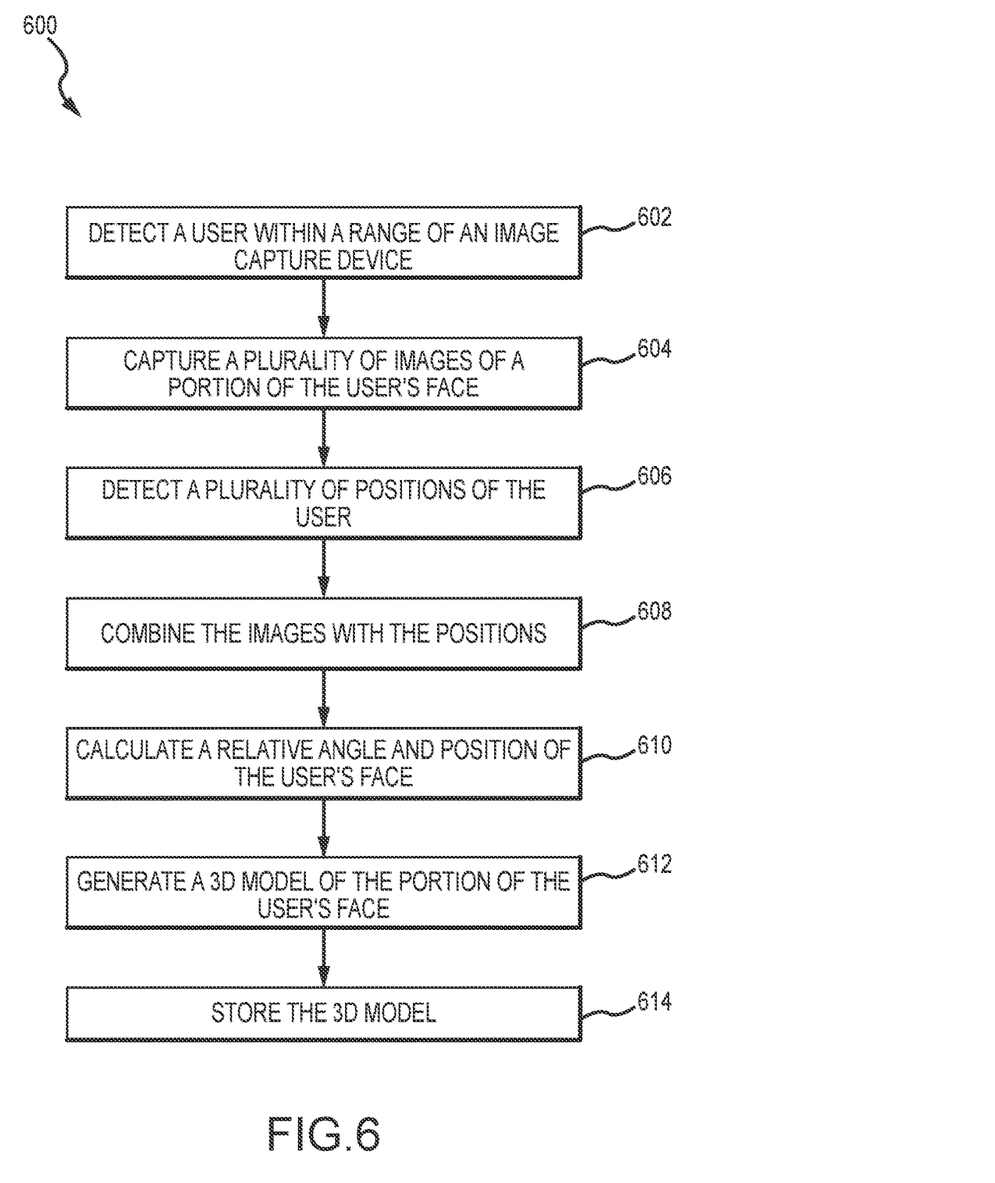
FIG. 6 depicts a flowchart of a process for creating a 3D facial reconstruction of a user of a transit system according to embodiments.

FIG. 6 depicts a process 600 for creating a 3D facial reconstruction of a user of a transit system is provided. Process 600 may be performed by a fare access gate, central server, and/or other computing device. At block 602, a user may be detected within a range of an image capture device positioned at a transit access point. In some embodiments, this may be done by detecting a fare validation event at the transit access point and triggering the image capture device to capture the plurality of images. In other embodiments, the user may be detected by a motion sensor and/or positional sensors. At block 604, a plurality of images may be captured of a first portion of the user's face using the image capture device while the user passes through the range of the image capture device. Each image may show the user's face at a different angle based on the user's movement relative to the image capture device. Each image may also have a timestamp indicating a time when the image was captured. A plurality of positions of the user may be detected as the user passes through the range of the image capture device at block 606. For example, this may be done by receiving position information from light-based position sensors and/or sound-based position sensors positioned proximate to the transit access point. The user may break a beam or wave of these sensors, which may allow the position sensors to determine the user's position at each point in time. As another example, the position detection may be done by receiving position information from a second image capture device. For example, a wide-angle camera or other image capture device may be positioned relative to the fare access gate such that it may monitor a position of the user as the user passes through the fare access gate. In other embodiments, a user's walking speed may be measured and/or estimated such that upon detecting a ticket validation event and/or a user passing through a positional sensor, the user's position may be estimated. A timestamp may be associated with each of a number of position readings detected by the positional sensors.

The plurality of images may be combined with the plurality of positions at block 608. In some embodiments, this may be done by matching timestamps of positional information with timestamps of the images to generate a set of combined position and image data points. At block 610, a relative angle and position of the user's face may be calculated based on the combination of the plurality of images and the plurality of positions. A 3D model of the first portion of the user's face may be generated based on the calculated relative angle and position at block 612. As one example, the position information may be combine with the images to generate a series of data points or coordinates that may be mapped out on a 3D coordinate system. The position information may be used to help identify facial features from one image to the next such that the data points corresponding to particular facial features may be properly placed on the coordinate system. This produces a mesh that may serve as a facial model for the user. As additional data and models are generated, more data points may be collected, which may be used to fill in gaps in the mesh to create a more complete and accurate model of the user's face.

At block 614, the 3D model be stored. For example, this may be done on a database of a fare access gate and/or on a central server. In embodiments where the 3D model is generated at the fare access gate, the model may be communicated to a central server such that the server may store the 3D model and provide the model to other fare access gates within the transit system.

In some embodiments, a second portion of the user's face may be similarly imaged and modeled using a second image capture device positioned on a side of the fare access gate opposite of the original image capture device. The imaging and modeling for each side of the user's face may be done concurrently and the models combined to generate a 3D model of the user's entire face. In other embodiments, the second portion or side of the user's face may be modeled based on a separate or subsequent passage through the same or different fare access gate. For example, a user may pass through the same fare access gate in an opposite direction such that the image capture device is positioned to image the second side of the user's face. During subsequent passages where a user's face has already been modeled, a new 3D model may be generated and combined with the stored 3D model. Thus, the stored 3D model may be updated to improve the accuracy of the model.

Upon generation of the 3D model, the model may be used to identify a user and determine whether the user is on a whitelist or blacklist. The 3D model may allow facial images and/or models to serve as tokens for transit access, as the models may be associated with a transit user, transit account, and/or fare media identifier.

Figure 7:
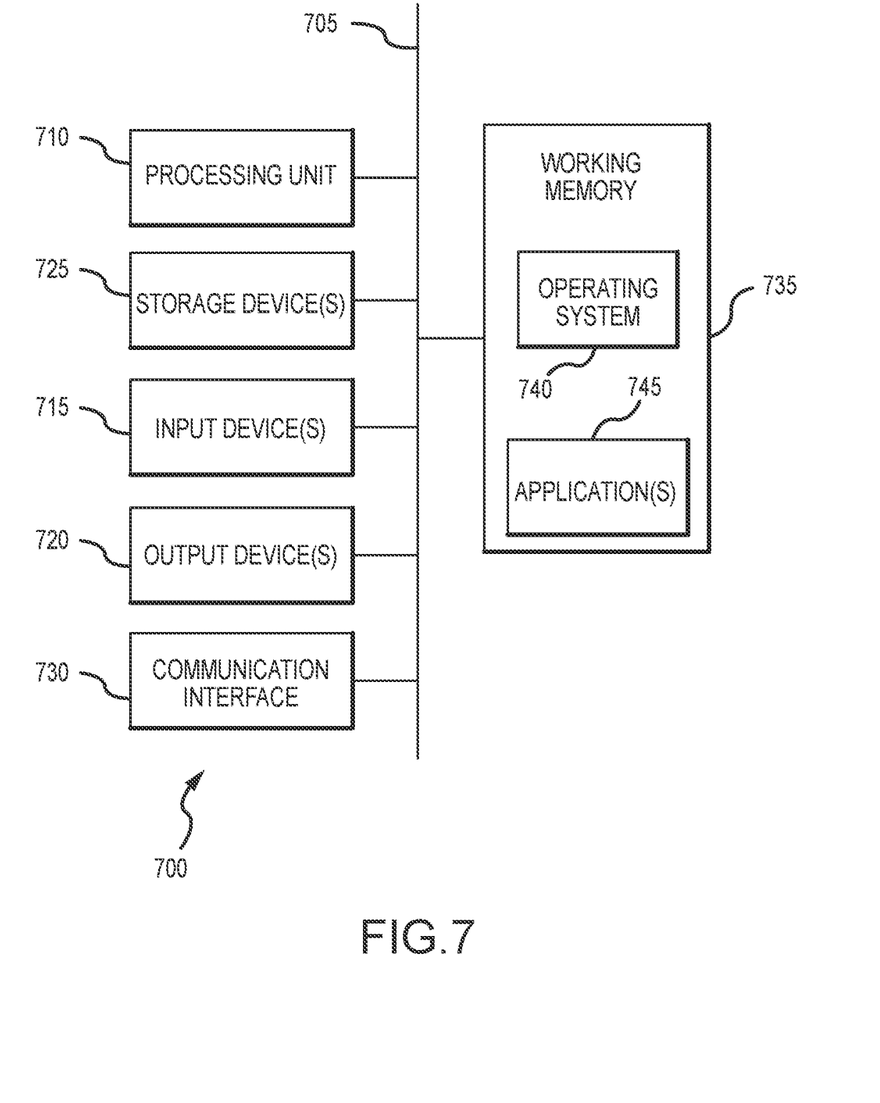
FIG. 7 depicts computer system according to embodiments.

A computer system as illustrated in FIG. 7 may be incorporated as part of the previously described computerized devices. For example, computer system 700 can represent some of the components of the image capture devices, positional sensors, fare access gates and/or central servers described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more general-purpose processors and/or one or more special-purpose processors (such as digital signal processing chips, graphics acceleration processors, and/or the like); one or more input devices 715, which can include without limitation a mouse, a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method of creating a 3-dimensional facial reconstruction of a user of a transit system, the method comprising:
   detecting a user within a range of an image capture device positioned at a transit access point;
   capturing a plurality of images of a first portion of the user's face using the image capture device while the user passes through the range of the image capture device;
   detecting a plurality of positions of the user as the user passes through the range of the image capture device by detecting breaks in a plurality of position-sensing cross beams that extend across the transit access point as the user passes through the plurality of position-sensing cross beams;
   combining the plurality of images with the plurality of positions;
   calculating a relative angle and position of the user's face based on the combination of the plurality of images and the plurality of positions;
   generating a 3-dimensional model of the first portion of the user's face based on the calculated relative angle and position;
   storing the 3-dimensional model;
   generating a second 3-dimensional model based on a separate instance of the user passing through the transit access point or through a second transit access point; and
   updating the stored 3-dimensional model by combining the stored 3-dimensional model with the second 3-dimensional model.

2. The method of creating a 3-dimensional facial reconstruction of a user of a transit system of claim 1, wherein:

detecting the plurality of positions comprises receiving position information from the plurality of position-sensing cross beams; and the plurality of position-sensing cross beams are generated by one or more of light-based position sensors or sound-based position sensors positioned proximate to the transit access point.

3. The method of creating a 3-dimensional facial reconstruction of a user of a transit system of claim 1, wherein:

detecting the plurality of positions comprises receiving position information from a second image capture device.

4. The method of creating a 3-dimensional facial reconstruction of a user of a transit system of claim 1, wherein:

each of the plurality of images and each of the plurality of positions comprises a timestamp; and combining the plurality of images with the plurality of positions comprises matching the timestamp from each of the plurality of images with a corresponding timestamp from one of the plurality of positions.

5. The method of creating a 3-dimensional facial reconstruction of a user of a transit system of claim 1, further comprising:

capturing a second plurality of images of a second portion of the user's face using a second image capture device; and generating a 3-dimensional model of the second portion of the user's face using the second plurality of images.

6. The method of creating a 3-dimensional facial reconstruction of a user of a transit system of claim 1, wherein:

detecting the user within the range of the image capture device comprises detecting a fare validation event at the transit access point and triggering the image capture device to capture the plurality of images.

7. A non-transitory computer-readable medium having instructions embedded thereon for creating a 3-dimensional facial reconstruction of a user of a transit system, the instructions comprising computer code for causing a computing device to:

detect a user within a range of an image capture device positioned at a transit access point;

capture a plurality of images of a first portion of the user's face using the image capture device while the user passes through the range of the image capture device;

detect a plurality of positions of the user as the user passes through the range of the image capture device by detecting breaks in a plurality of position-sensing cross beams that extend across the transit access point as the user passes through the plurality of position-sensing cross beams;

combine the plurality of images with the plurality of positions;

calculate a relative angle and position of the user's face based on the combination of the plurality of images and the plurality of positions;

generate a 3-dimensional model of the first portion of the user's face based on the calculated relative angle and position; and store the 3-dimensional model.

8. The non-transitory computer-readable medium of claim 7, wherein:

detecting the plurality of positions comprises receiving position information from the plurality of position-sensing cross beams; and the plurality of position-sensing cross beams are generated by one or more of light-based position sensors or sound-based position sensors positioned proximate to the transit access point.

9. The non-transitory computer-readable medium of claim 7, wherein:

detecting the plurality of positions comprises receiving position information from a second image capture device.

10. The non-transitory computer-readable medium of claim 7, wherein:

each of the plurality of images and each of the plurality of positions comprises a timestamp; and combining the plurality of images with the plurality of positions comprises matching the timestamp from each of the plurality of images with a corresponding timestamp from one of the plurality of positions.

11. The non-transitory computer-readable medium of claim 7, further comprising instructions for causing the computing device to:

capture a second plurality of images of a second portion of the user's face using a second image capture device; and generate a 3-dimensional model of the second portion of the user's face using the second plurality of images.

12. The non-transitory computer-readable medium of claim 7, wherein:

detecting the user within the range of the image capture device comprises detecting a fare validation event at the transit access point and triggering the image capture device to capture the plurality of images.

13. A system for creating a 3-dimensional facial reconstruction of a user of a transit system, the system comprising:

an image capture device positioned to capture an image of a user's face as the user passes through a transit access point;

a user detection module configured to determine when a user is within a range of the image capture device;

a position module configured to determine a position of the user as the user passes through the transit access point, wherein the position module comprises a plurality of position-sensing cross beams that extend across the transit access point;

a facial model generation module configured to generate a 3-dimensional model using images from the image capture device;

a communications module;

a memory; and a processor, the processor configured to:

detect, using the user detection module, the user within a range of the image capture device positioned at a transit access point;

capture a plurality of images of a first portion of the user's face using the image capture device while the user passes through the range of the image capture device;

detect, using the position module, a plurality of positions of the user as the user passes through the range of the image capture device by detecting breaks in the plurality of position-sensing cross beams as the user passes through the plurality of position-sensing cross beams;

combine the plurality of images with the plurality of positions;

calculate a relative angle and position of the user's face based on the combination of the plurality of images and the plurality of positions;

generate, using the facial model generation module, a 3-dimensional model of the first portion of the user's face based on the calculated relative angle and position; and store the 3-dimensional model.

14. The system for creating a 3-dimensional facial reconstruction of a user of a transit system of claim 13, wherein:

the plurality of position-sensing cross beams are generated by one or more of light-based position sensors or sound-based position sensors positioned proximate to the transit access point.

15. The system for creating a 3-dimensional facial reconstruction of a user of a transit system of claim 13, wherein:

the position module comprises a second image capture device.

16. The system for creating a 3-dimensional facial reconstruction of a user of a transit system of claim 13, wherein:

each of the plurality of images and each of the plurality of positions comprises a timestamp; and combining the plurality of images with the plurality of positions comprises matching the timestamp from each of the plurality of images with a corresponding timestamp from one of the plurality of positions.

17. The system for creating a 3-dimensional facial reconstruction of a user of a transit system of claim 13, further comprising:

a second image capture device, wherein the processor is further configured to:

capture a second plurality of images of a second portion of the user's face using the second image capture device; and generate, using the facial model generation module, a 3-dimensional model of the second portion of the user's face using the second plurality of images.

18. The system for creating a 3-dimensional facial reconstruction of a user of a transit system of claim 13, wherein:

detecting the user within the range of the image capture device comprises detecting a fare validation event at the transit access point and triggering the image capture device to capture the plurality of images.

* * * * *